(12) United States Patent
Melvin

(10) Patent No.: US 10,051,555 B1
(45) Date of Patent: Aug. 14, 2018

(54) USER SPECIFIC ACCESS THROTTLER FOR ACCESS POINTS

(71) Applicant: Stephen Waller Melvin, Vancouver (CA)

(72) Inventor: Stephen Waller Melvin, Vancouver (CA)

( * ) Notice: Subject to any disclaimer, the term of this patent is extended or adjusted under 35 U.S.C. 154(b) by 48 days.

(21) Appl. No.: 15/148,240

(22) Filed: May 6, 2016

(51) Int. Cl.
| | |
|---|---|
| *H04W 48/14* | (2009.01) |
| *H04W 72/04* | (2009.01) |
| *H04L 1/00* | (2006.01) |
| *H04L 29/08* | (2006.01) |
| *H04L 29/06* | (2006.01) |
| *H04W 88/08* | (2009.01) |
| *H04W 84/12* | (2009.01) |
| *H04W 88/12* | (2009.01) |
| *H04L 29/12* | (2006.01) |

(52) U.S. Cl.
CPC .......... *H04W 48/14* (2013.01); *H04L 1/0018* (2013.01); *H04L 67/306* (2013.01); *H04L 69/28* (2013.01); *H04W 72/0453* (2013.01); *H04L 61/6022* (2013.01); *H04W 84/12* (2013.01); *H04W 88/08* (2013.01); *H04W 88/12* (2013.01)

(58) Field of Classification Search
CPC . H04W 48/14; H04W 72/0453; H04W 84/12; H04W 88/08; H04W 88/12; H04L 1/0018; H04L 67/306; H04L 69/28; H04L 61/6022

USPC ............................... 370/229–238.1, 310–350
See application file for complete search history.

(56) References Cited

U.S. PATENT DOCUMENTS

| | | | | |
|---|---|---|---|---|
| 2015/0026774 | A1* | 1/2015 | Yang | H04W 12/06 726/4 |
| 2015/0223068 | A1* | 8/2015 | Thelen | H04L 63/083 726/7 |

* cited by examiner

*Primary Examiner* — Christine Ng
(74) *Attorney, Agent, or Firm* — Stephen W. Melvin

(57) ABSTRACT

A device and method to control access to a wide area network such as the Internet is described in which specific users connected to an access point, such as a wireless access point, are given a controllable amount of connection performance, in terms of bandwidth, latency and/or packet loss. The bandwidth, latency and/or packet loss to each user may be controlled individually and as users spend more time connected to the access point they may be given less and less connection performance. Such a system may reward new users in favor of users who have spent a long time connected to the access point, which will discourage users from spending long periods of time occupying physical space and accessing an upstream network that would otherwise be available for new users. Connection performance may also cycle through connected users to manage bandwidth. Additionally, performance parameters can be controlled to encourage certain types of activity over others (e.g. video streaming, voice over IP, web browsing, etc.). Optionally a user may be able to reset their performance allocation with a purchase or other activity, such as viewing an advertisement, completing a survey or participating in some other activity.

24 Claims, 8 Drawing Sheets

USER SPECIFIC ACCESS THROTTLER FOR ACCESS POINTS

FIELD OF THE INVENTION

This invention relates to the field of computer networking, and more specifically to controlling shared access to a network on a per user basis.

BACKGROUND

Public access points, such as wireless access points, are common today in a large number of locations such as restaurants, cafes, government facilities, airplanes and taxicabs. Typically all users sharing an access point are given roughly equivalent access to the shared network and compete for upstream bandwidth equally. This can create situations where people spend long periods of time monopolizing access to the network, and monopolizing physical access in the vicinity of the access point, while new users are inconvenienced. This can be particularly problematic for owners of private facilities such as cafes where users can occupy physical space that would otherwise be available for paying customers. What is needed is an improved method for controlling access by users sharing a common access point.

SUMMARY

A device and method to control access to a wide area network such as the Internet is described in which specific users connected to an access point, such as a wireless access point, are given a controllable amount of connection performance, in terms of bandwidth, latency and/or packet loss. The bandwidth, latency and/or packet loss to each user may be controlled individually and as users spend more time connected to the access point they may be given less and less connection performance. Such a system may reward new users in favor of users who have spent a long time connected to the access point, which will discourage users from spending long periods of time occupying physical space and accessing an upstream network that would otherwise be available for new users. Connection performance may also cycle through connected users to manage bandwidth. Additionally, performance parameters can be controlled to encourage certain types of activity over others (e.g. video streaming, voice over IP, web browsing, etc.). Optionally a user may be able to reset their performance allocation with a purchase or other activity, such as viewing an advertisement, completing a survey or participating in some other activity.

DETAILED DESCRIPTION

Figure 1:
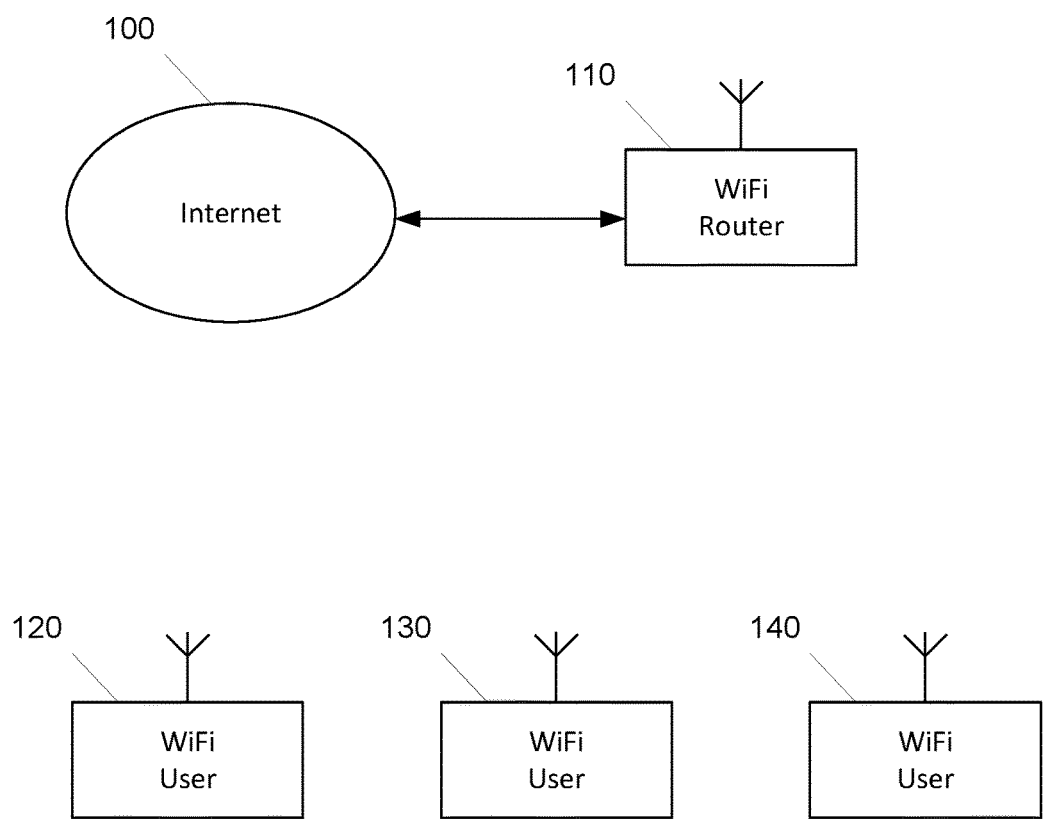
FIG. 1 illustrates a prior art configuration of a wireless access point.

FIG. 1 illustrates a traditional wireless access point. Wi-Fi Router 110 is connected to Internet 100 through a connection such as a cable modem, DSL modem, satellite connection, fiber optic line, leased line or other arrangement. Typically Wi-Fi router 110 is a combined router and Wi-Fi access point which offers DHCP services for automatic IP address allocation and NAT address translation for transparent access to Internet 100. Wi-Fi users 120, 130 and 140 represent individual users who may be connected to Wi-Fi router 110 on a laptop, tablet, smartphone, e-reader or other device. Wi-Fi router 110 typically treats all users equally according to traditional prioritization and collision protocols that do not distinguish between users based on their history, such as the amount of time they have been connected or the amount of bandwidth they have consumed. In many cases free public Wi-Fi is used as a way to attract customers to a private business. Unfortunately some may abuse the privilege by staying long periods of time with only a single purchase or no purchase at all, and may monopolize physical space which may drive away other customers.

Figure 2:
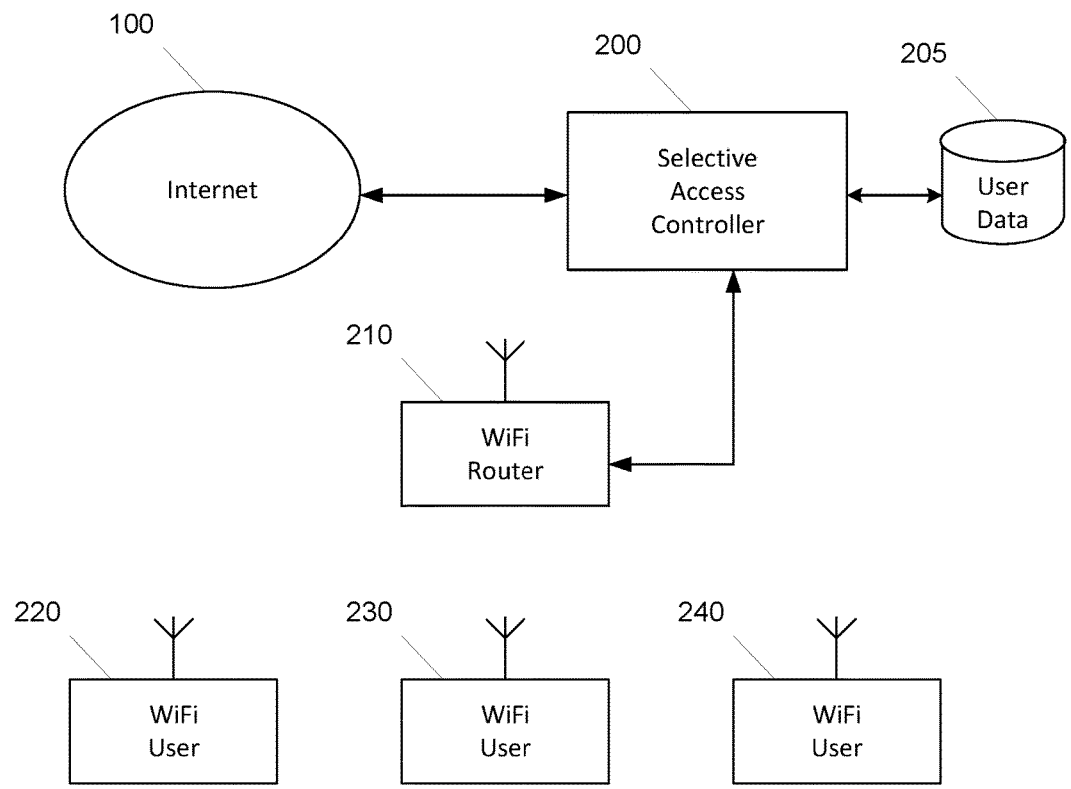
FIG. 2 illustrates an embodiment of the present invention.

FIG. 2 illustrates an embodiment of the present invention. Selective Access Throttler 200 is interposed between Internet 100 and Wi-Fi Router 210. In some embodiments the Selective Access Throttler 200 and Wi-Fi Router 210 may be incorporated into the same physical device and in fact the functionality of each may be fully integrated into the software of a single hardware platform. User Data 205 is used to keep track of which users are connected and to maintain data associated with connected users such as the amount of time connected and bandwidth consumed. Users 220, 230 and 240 represent individual users who may be connected to Wi-Fi Router 210 on a laptop, tablet, smartphone, e-reader or other device. In a typical embodiment, Wi-Fi Router 210 is a combined router and Wi-Fi access point which offers DHCP services for automatic IP address allocation and NAT address translation for transparent access to Internet 100. In one embodiment Wi-Fi Router 210 communicates with Users 220, 230 and 240 using an IEEE 802.11 compliant communications protocol. In an alternative embodiment Selective Access Throttler 200 is coupled to a local area network, such as a corporate LAN, which may or may not be further coupled to the Internet 100. In a preferred embodiment Selective Access Throttler 200 and Wi-Fi Router 210 include one or more processors executing instructions stored in a non-transitory storage medium.

In other embodiments of the present invention, Wi-Fi Router 210 is replaced with a wired router and Users 220, 230 and 240 are coupled via a wired connection to the router. Selective Access Throttler 200 is then coupled between a wide area network and the wired router. Even though many embodiments of the present invention are described in connection to a wireless network and a wireless access point, the same principles would apply to multiple users communicating over a wired network and sharing access to an upstream wide area network such as the Internet.

One function of Selective Access Throttler 200 is to maintain information associated with individual users and to control the access given to each user selectively. Users Data 205 is used to maintain user identification and user status. User Data 205 could be stored in a database or organized in another form, and may be stored on a disk drive or on any other form of storage under the control of Selective Access Throttler 200, whether in bulk storage, volatile or non-volatile memory, or whether stored internally or externally.

There are a variety of ways that Users 220, 230 and 240 could be identified to Selective Access Throttler 200. One mechanism is to use the media access control (MAC) addresses associated with an 802.11 wireless adapters on the user device. An 802.11 MAC address is a 48-bit globally unique number that is associated with a wireless adapter. Other forms of unique identifiers associated with the wireless adapter may also be used. In some embodiments Selective Access Throttler 200 uses web browser cookies associated with the user machine and/or usernames such as those associated with a login or authorization process. Selective Access Throttler 200 may also use a device fingerprint or a browser fingerprint. A device fingerprint is information collected from a user's machine that is ideally both unique and unchanging. However, in practice a device fingerprint may be used even if not guaranteed to be unique and unchanging as long as it is relatively unique and relatively unchanging. Device fingerprints may be passively collected or actively collected. Device fingerprint information includes TCP/IP configuration, OS fingerprints, 802.11 wireless settings, clock skew, hardware serial numbers and the like. Browser based fingerprinting can be used in addition or instead of device fingerprinting. Browser fingerprinting includes information such information as time zone, screen resolution, plugin choices and fonts.

In some cases, information used for user identification, such as the MAC address of a network adapter can be changed by a user, in particular by sophisticated users using specialized tools. Such changes may frustrate the attempt to track users by such identification. However, a diverse selection of data used for user identification can make such changes evident. For example, a new user with a collection of information that matches a previous user in all but one way in some cases may be safely considered to be the previous user. In such a case the user identification information can be updated to reflect the change in a portion of the user identification information. In alternative embodiments attempts may be made to verify or validate MAC addresses and preferential access may be given to users with validated or signed MAC addresses. U.S. Pat. No. 7,668,954, incorporated herein by reference, discusses mechanisms to validate MAC addresses and other mechanisms to uniquely identify users.

User identification is important to allow Selective Access Throttler 200 to know when a user first joins the wireless network. If the result of the user identification results in no matches within User Data 205, then the user is considered to be joining the network for the first time. Selective Access Throttler 200 in a preferred embodiment also tracks inactivity and will reset the status of a known user after a period of inactivity. For example, if a user has not accessed the network for a period of one hour then the user might be considered to be inactive. In this case, the user would be treated as a new user if they return to the network. The period of inactivity that triggers a reset to new status could be some other value, such as two or 12 hours and could also depend on the time of day or the day of the week. Returning an inactive user to new status can be accomplished by simply deleting the information in User Data 205 associated with that user. Alternatively long term user tracking may be utilized as described in more detail below.

Identification of users allows Selective Access Throttler 200 to individually control the connection performance of each user. Here we use the term "connection performance" to refer to one or more parameters that relate to the performance of the connection between the upstream network, such as the Internet 100, and the user. Such parameters include: bandwidth, latency, packet loss, and the variability of those parameters. In some embodiments, control of connection performance may involve control of only one of the above named parameters and in other embodiments multiple parameters may be controlled together. For example, Selective Access Throttler 200 may control the bandwidth allocation to each user. A user could be given an allocation of a bandwidth between 1 Mbs and 10 Mbs and that allocation may vary over time. Alternatively a user may be given an allocation of packet latency of 10 ms to 500 ms and that allocation may vary over time. In other embodiments, bandwidth and latency are controlled together in forming the connection performance of a given user.

In one embodiment of the invention, Selective Access Throttler 200 controls the connection performance by using a combination of packet delay and packet loss. A typical device drops packets based on congestion only when necessary and routers and switches are generally designed to implement a best effort delivery for individual packets and to deliver them as quickly as possible. However, Selective Access Throttler 200 may impose additional packet delay and/or additional packet loss in order to enforce an allocated connection performance.

Packet delay may be used to control the rate at which downstream packets are delivered to a user device from the upstream network and/or to control the rate at which upstream packets are delivered from a user device to the upstream network. Packet delay can be used to implement a bandwidth maximum and/or to impose a minimum packet latency. Packets may be queued internally to Selective Access Throttler 200 and the rate at which they are output may be controlled according to a bandwidth and/or latency requirement. Packet loss is another mechanism that is used to control connection performance. Depending on the sizes of internal queues of the Selective Access Throttler 200, packets may need to be discarded if the incoming packet or data rate exceeds the outgoing packet or data rate for an extended period as the queues will overflow. Packet loss may also be used to enforce a bandwidth maximum by discarding packets rather than queueing them when the data rate is exceeded. Packet loss may also be controlled independently as a separate parameter of the connection performance. That is, packets to a given user may be discarded based on an allocated level of packet loss.

Depending on the type of activity a user is engaged in, packet loss may have a different effect. If the user is communicating over a reliable stream transport, such as TCP, then packet loss will eventually cause a retransmission of that packet. Such retransmission may result in a decrease in bandwidth based on the window size of the TCP connection and will typically result in an increase in latency. User software communicating over a TCP connection may adapt to a bandwidth limit imposed by packet loss by lowering the bandwidth requirements. If the user is communicating over an unreliable stream transport, such as UDP, then packet loss will typically lower the quality of the connection but not cause a retransmission of the packet. Such packet loss may be tolerable depending on the degree of packet loss. For example, a 1% to 5% packet loss for a voice over IP (VoIP) connection may be acceptable in some circumstances. User software communicating over a UDP connection may adapt to a bandwidth limit imposed by packet loss by lowering the bandwidth requirements. In some cases increasing the packet loss for an unreliable stream transport is an effective way to discourage but not prevent a user from utilizing such a function, and if the packet loss increases gradually the user will be eventually motivated to discontinue use of the network and move on.

Variability on bandwidth, latency and packet loss may also be used to control the connection performance for a given user. Rather than imposing a fixed limit, Selective Access Throttler 200 may impose a limit that is averaged over a time interval, so it is allowed to exceed the limit for short periods. Also, Selective Access Throttler 200 may impose a limit that intentionally varies over time. For example, lowering a bandwidth maximum to a low value for several seconds before returning it to its previous value may be an effective way to disturb the communication and essentially lower the quality of the user experience without preventing it altogether. This may also be accomplished by increasing the minimum latency for a connection to a high value for several seconds before returning it to its previous value. The degree by which the connection performance is varied, and the timing of when variation is applied may be increased over time, such that average connection performance is reduced over time. In this way, by gradually lowering the quality of the user experience, without restricting any activity outright, the user will be eventually be motivated to leave the network in favor of other newer users.

In some embodiments downstream connection performance and upstream connection performance are individually controllable. In some embodiments both upstream and downstream connection performance are controlled equally and at the same level. In other embodiments the degree of performance may be different or connection performance in one direction may not be controlled at all. For example, it may be sufficient in some cases to control only downstream connection performance and deliver upstream packets without any restrictions. Such a design may simplify the design of Selective Access Controller 200 without any reduction in the advantages a system such as that described herein provides.

Figure 3:
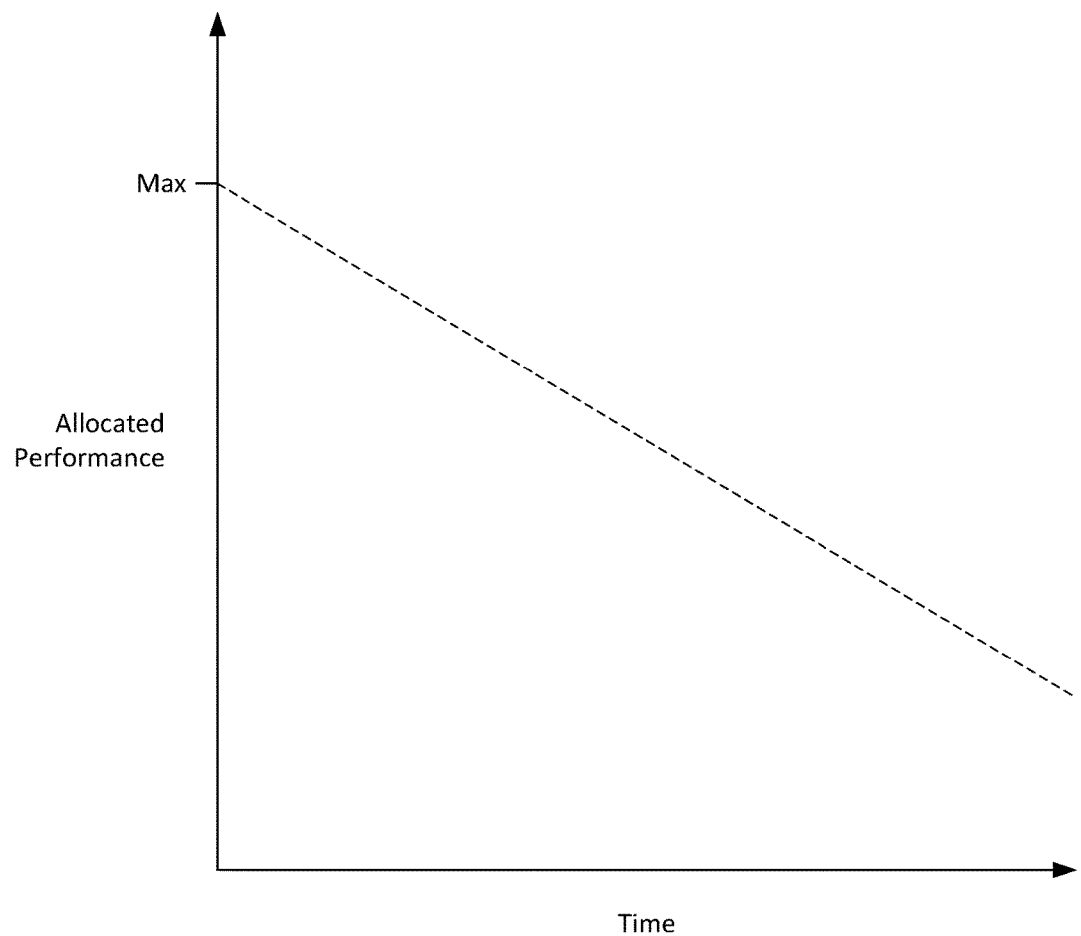
FIG. 3 illustrates a graph of connection performance over time for a given user.

FIG. 3 illustrates a per-user access control policy implementation example. It is a graph of connection performance over time for a given user. In this case a user is given a slowly reducing amount of connection performance over time. Selective Access Controller 200 recognizes a new user at time zero according to the user identification mechanisms discussed above and sets the connection performance to a maximum value at that time. The vertical scale in FIG. 3 represents a value of connection performance as discussed above. This vertical scale of performance could be in terms of bandwidth, latency, packet loss and/or any combination of the above in addition to the variation in those values. For example, the user could be given an allocated performance of 10 Mbs bandwidth and 10 ms latency at time zero and over time the bandwidth could be gradually reduced while the latency is gradually increased. There may also be a minimum connection performance below which the user will be maintained, or the connection performance may continue to decrease, effectively disconnecting the user from the Internet after a certain point in time. The maximum value of connection performance that the user initially starts with may be a predetermined value, or may be a value that is chosen based on the time of day, the day of the week, characteristics of the individual user or some other value. The reduction in connection performance shown in FIG. 3 is a linear function with time. Other rates of reduction and other shapes of the reduction curve are possible in alternative embodiments.

While the curve shown in FIG. 3 is a smooth curve, in practice the connection performance changes would be more practically implemented in steps after a period of time has elapsed. For example, the Selective Access Throttler 200 may periodically compute modified connection performance settings and update User Data 205 accordingly. Such periodic adjustments could be made every second or 10 seconds or some other value and in fact need not be the same for each adjustment. A formula may be utilized to compute the new performance allocation based on elapsed time such that the graph of FIG. 3 is adhered to, even if the time at which the adjustments are made is not consistent. The actual performance settings may also be quantized such that they vary in steps even if a formula is used to compute a value to a high degree of precision. For example bandwidth changes may be implemented in steps of 0.5 Mbps, even if a formula is used to compute an allocated performance to multiple decimal points. The quantization in time and in performance allocation values is based on implementation efficiency considerations and does not affect the basic principles described herein. The figures discussed below also illustrate smooth curves but the discussion above in connection to FIG. 3 also applies.

Figure 4:
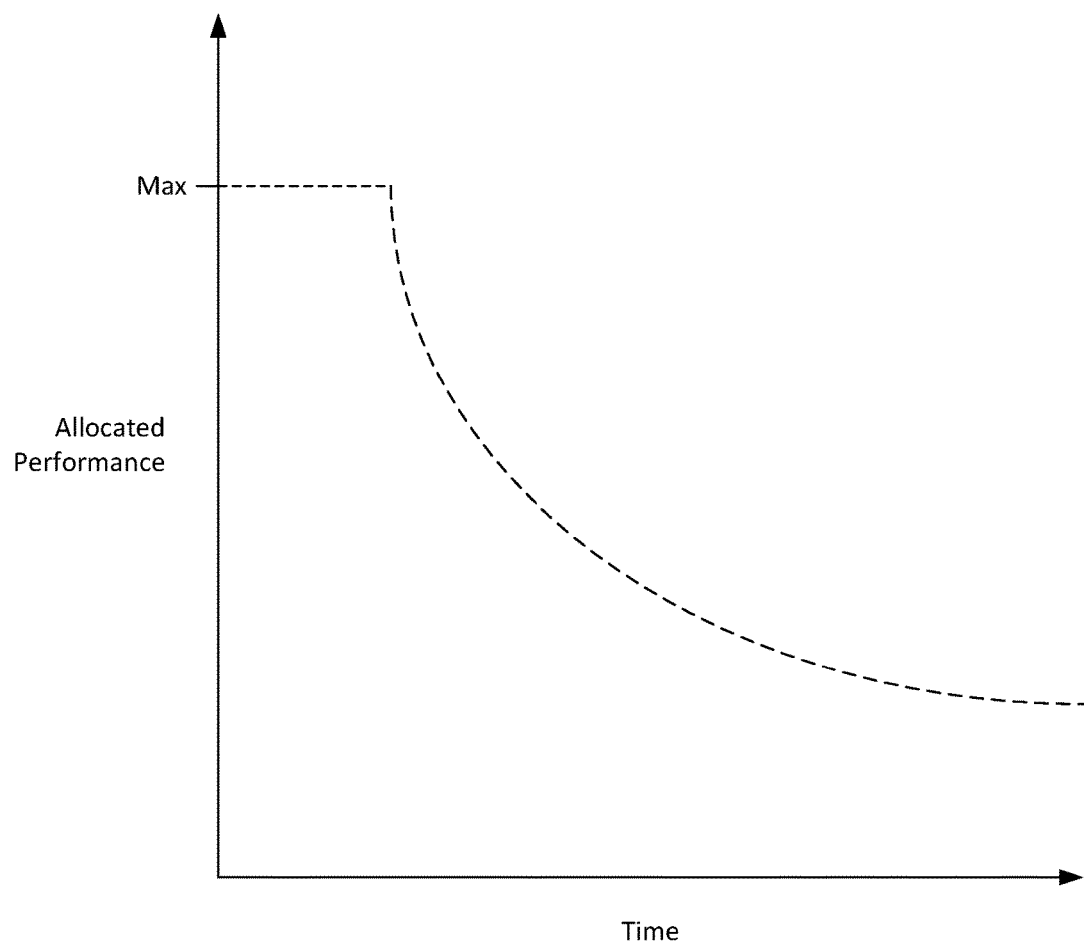
FIG. 4 illustrates a graph of connection performance over time for a given user.

FIG. 4 illustrates an alternative per-user access control policy implementation example. In this example, the maximum connection performance is available for a fixed period of time after a new user joins the network, before the allocated bandwidth decreases. The period of time that the user is given the maximum connection performance could be a fixed value, such as 15 minutes, or the value may be chosen based on factors such as the time of day, day of the week, characteristics of the user or some other value. Also shown in FIG. 4 is a reduction in connection performance with a positive second derivative, that is, one in which the rate of reduction decreases over time. Other shapes of the reduction curve are possible in alternative embodiments, such as parabolic or hyperbolic curves. FIG. 4 illustrates the connection performance approaching a minimum value. In some embodiments the connection performance maintains a minimum value after a certain time period, while in other the connection performance will continue to decrease, effectively cutting off the user from the Internet at a certain point.

Advantageously, embodiments of the present invention degrade the connection performance for a given user gracefully and discourage long term use. As such, users will be motivated to move on and leave physical space and bandwidth for new users, while the lack of a specific sharp cut-off allows them to continue to work if necessary, albeit at a degraded performance.

In some embodiments the connection performance reduction policy would be evident to users and would be fully disclosed to users of the wireless access point. Other operators may choose to disclose only certain details of the connection policy or no details at all. In certain jurisdictions there may be legal requirements for disclosure that need to be complied with by the operators of the wireless access point. An advantage to an operator for disclosing the connection access mechanisms being utilized may be that it will encourage customers to return at a later time as opposed to concluding that access is broken or flawed in some way. Additionally, as described in more detail below the operator may have policies that encourage returning customers by giving them enhanced connection performance.

Besides applying a strict time based reduction in connection performance, other embodiments may utilize other mechanisms to apply a reduction in connection performance. For example, the number of bytes transferred may be utilized to determine the current connection performance. In this case, a user who is utilizing lower bandwidth will have access at a higher performance for a longer period than those who are utilizing a higher performance. A combination of time elapsed as well as bytes transferred may also be used. Also, the connection performance allocation may depend on the number of other users and the time of day or some combination of the above. For example, if there are a small number of users on the network, it may be likely that physical space is not in short supply so the operator may want to impose no restrictions on connection performance, or apply a reduction curve that is not as steep.

In some embodiments, Selective Access Throttler maintains user data 205 for long periods of time to track user behavior at a given access point for days, weeks, years or longer. Long term tracking of user behavior can be used to provide an incentive for repeat customers. For example, users returning may be given credits or experience points such they get longer periods of higher connection performance. Such a system will discourage continuous long term use by all customers but will reward loyalty to an access point with slower reductions in performance. Encouraging repeat customers after a period of inactivity may benefit an operator under the idea that a user is likely to make at least one purchase for each visit to a physical location in which a wireless access point is located. As noted above a known user may be reset to new status after a period of inactivity and such long term tracking of users can be used for such purposes. In some embodiments the allocated performance that a user is given when they join a network after a period of inactivity may depend on the amount of time they have been inactive according to a formula. For example, an inactive period of 12 hours may give them a higher initial performance setting than an inactive period of only one hour.

Figure 5:
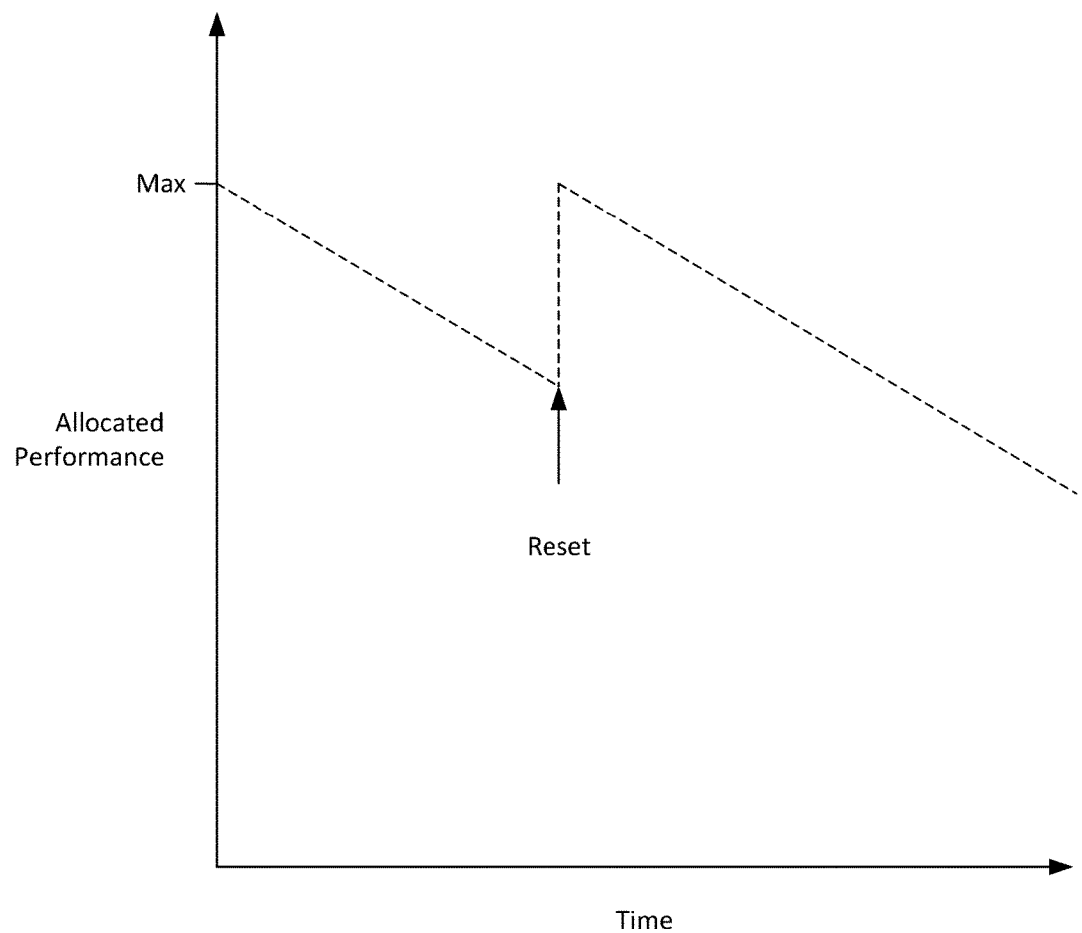
FIG. 5 illustrates a graph of connection performance over time for a given user.

FIG. 5 illustrates a per-user connection performance policy implementation example that includes a connection performance reset. As in FIG. 3 discussed above, in this case a user is given a slowly reducing connection performance over time. At a certain point, their allocation is reset back to the original value. The reset of connection performance allocation can be based on a new purchase or other activity. In one embodiment, a public space such as a cafe will reward purchases by resetting connection performance allocation. This can be accomplished with a code that can be typed into a control panel on a web browser, or the device used by the customer can be identified in other ways. The reset of connection performance may return to the original value as shown in FIG. 5, or may increase by a different amount, and may depend on the activity. In some embodiments the connection performance may exceed the original value based on the activity.

Figure 6:
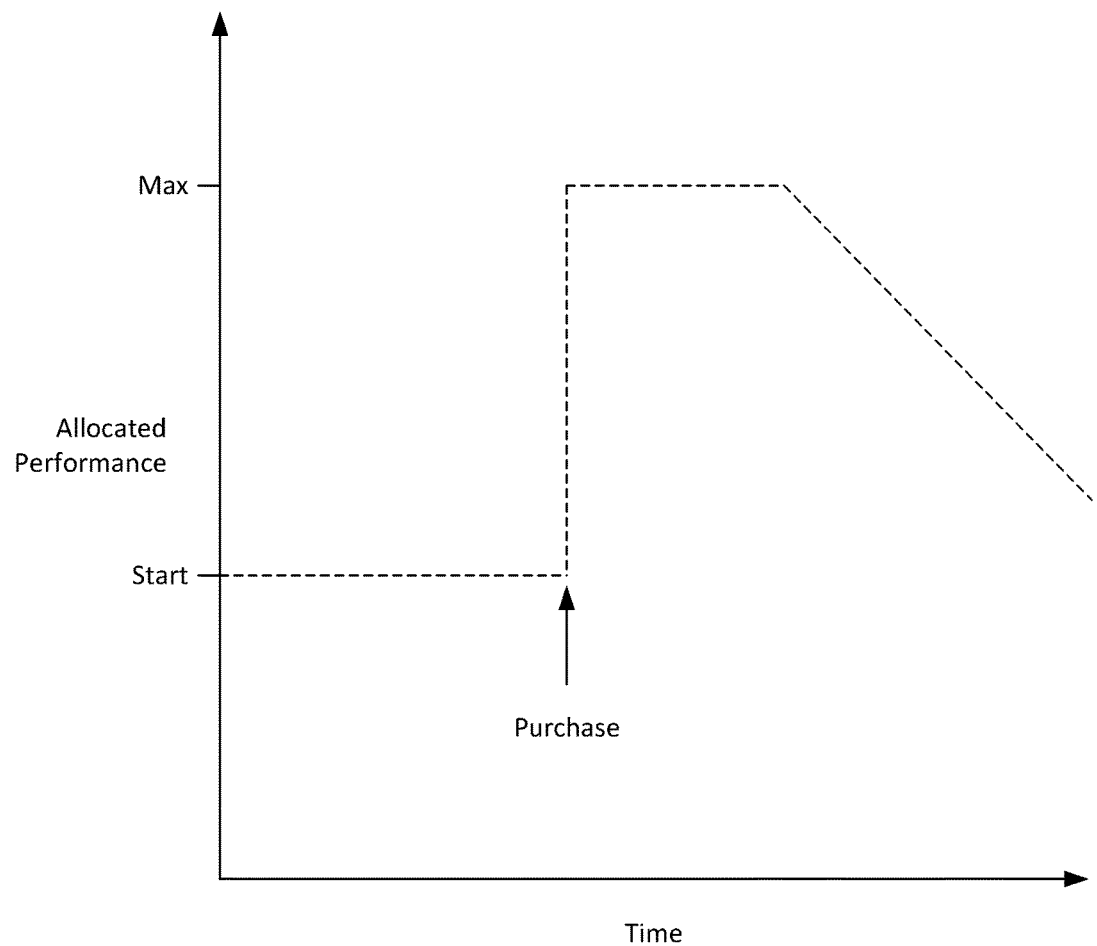
FIG. 6 illustrates a graph of connection performance over time for a given user.

FIG. 6 illustrates a per-user connection performance policy implementation that includes a change to the performance allocation based on a purchase. In this case, a new user is given a default "Start" amount of connection performance before a purchase is confirmed. Then, after a purchase or other activity, the user is given an enhanced connection performance. In the case of FIG. 5 and FIG. 6, there may be other ways to trigger an increase in connection performance. For example, a user may able to increase their connection performance by watching an advertisement or participating in a survey. Such incentives may be advantageously used by the system operator to monetize advertising or survey participation or the system operator may be directly involved in the survey such that the collection of information is directly applicable to the business of the system operator.

Figure 7:
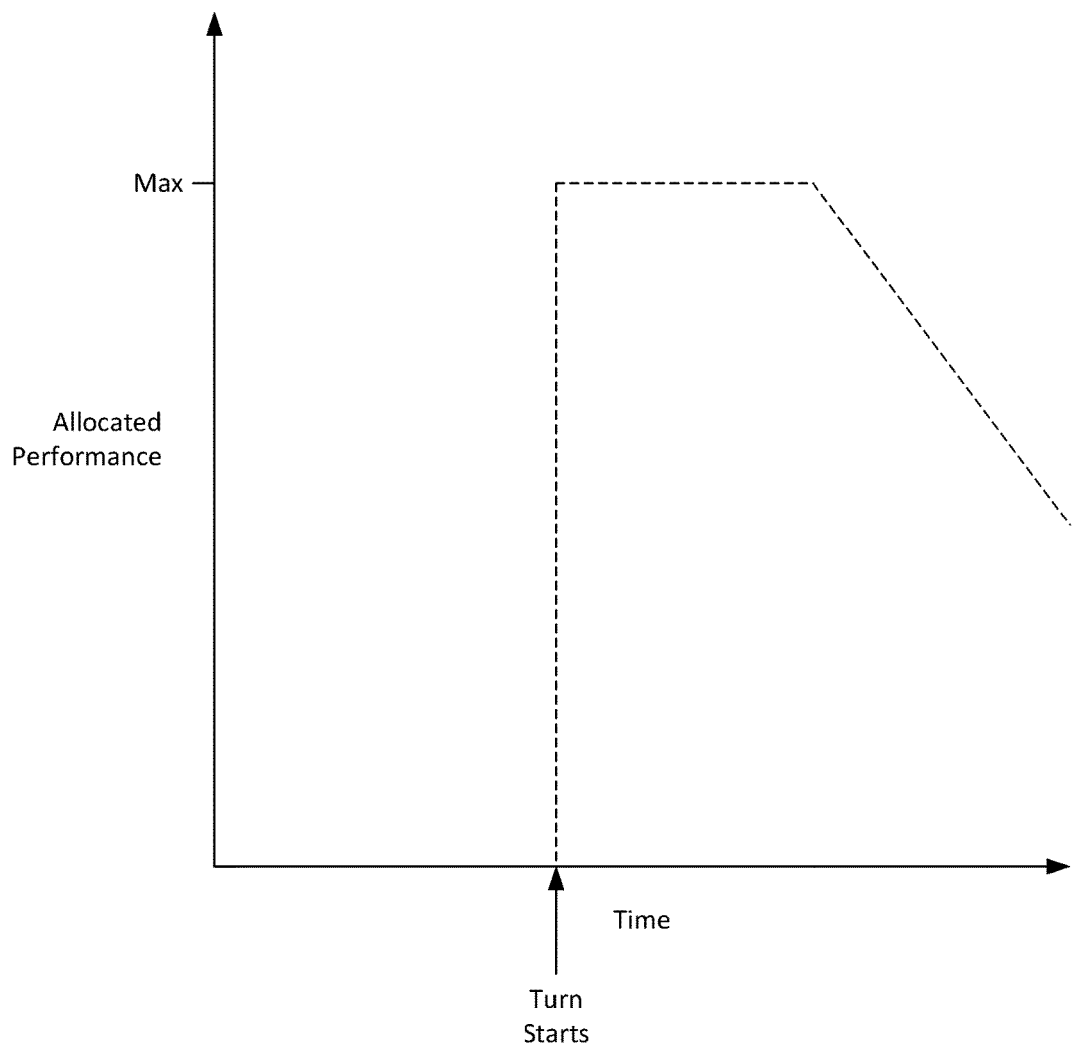
FIG. 7 illustrates a graph of connection performance over time for a given user.

FIG. 7 illustrates a per-user connection performance policy in which a user initially starts out with zero performance, in other words they are unable to communicate with the upstream network. In such a scenario communication may be allowed but only to an allowed destination, such as a web server on the local network for control and information purposes. At a certain point, the user's turn starts and they are then given an allocated connection performance. The scenario illustrated in FIG. 7 may be useful in cases where an enormous number of users are attempting to connect to the wireless access point and upstream bandwidth is incapable of handling all of them. Rather than giving all users an extremely narrow slice of the upstream bandwidth, it may be more practical to give groups of users turns at the upstream network. Users may be given turns based on a number of different factors including preferential features as well as how long they have waited. In some embodiments a web-based console indicates to the user how long they have to wait until they are allowed access to the upstream network. Once access is granted, the user may be given a fixed allocation of performance for a period of time as shown in FIG. 7, or the connection performance may gradually decrease over time such as illustrated in FIG. 3. In some embodiments, turns at the upstream bandwidth may cycle through the connected users periodically.

In some embodiments, the type of user activity can be controlled through the adjustment of the performance allocation per user. For example, video streaming is characterized by the need for relatively high bandwidth but is tolerant of high latency. Thus, a high bandwidth, high latency performance setting would accommodate video streaming. Voice over IP (VOIP) on the other hand, is characterized by the need for relatively low latency, but does not need much bandwidth. Thus, a low bandwidth, low latency performance setting would accommodate VOIP but not video streaming. Email correspondence and typical web browsing is characterized by the ability to accommodate both low bandwidth and high latency. Thus, a low bandwidth, high latency performance setting would accommodate email correspondence but not video streaming or VOIP. Interactive video gaming is an example of an activity that requires both high bandwidth and low latency.

Figure 8:
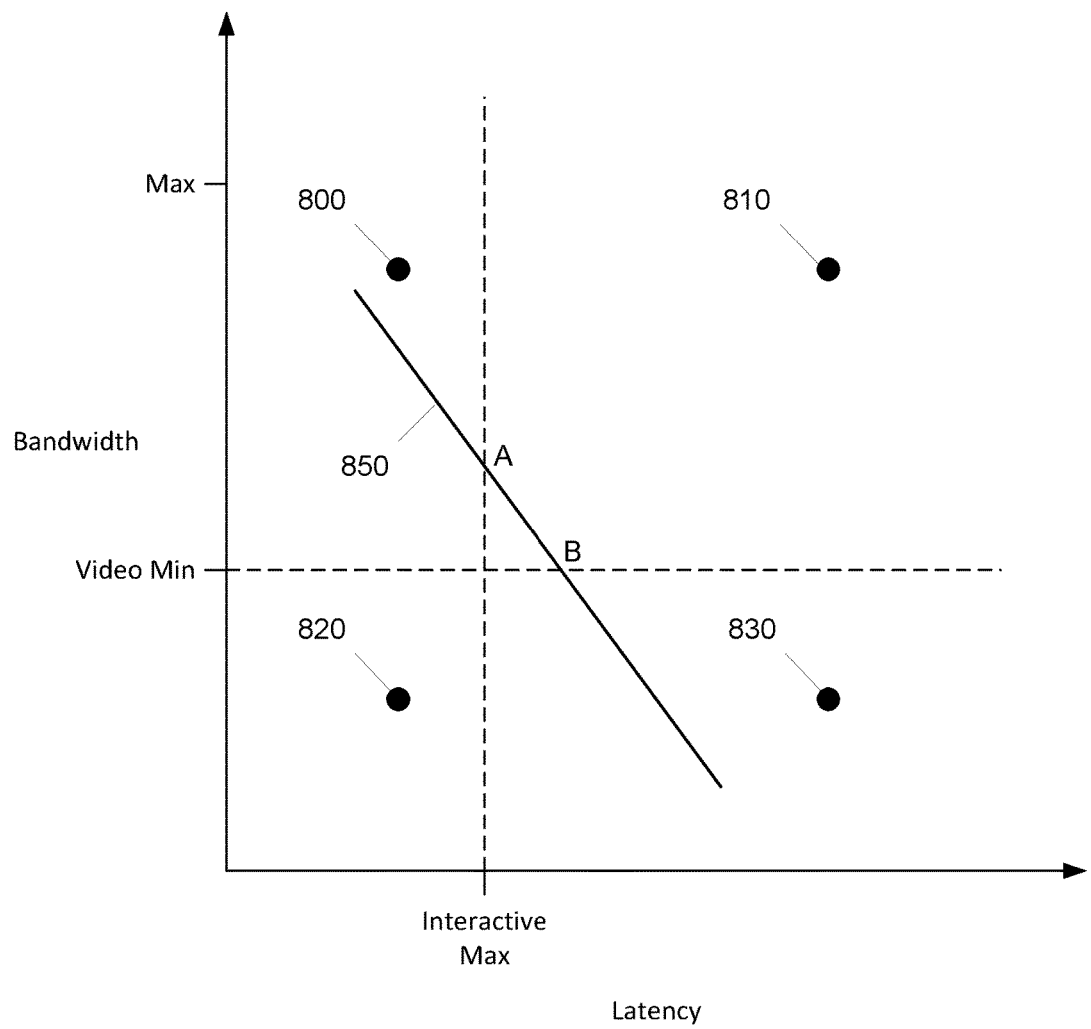
FIG. 8 illustrates a variety of bandwidth/latency performance set points.

FIG. 8 illustrates a variety of connection performance set points in terms of bandwidth and latency. As noted above, different types of network activity have different requirements and characteristics. A high bandwidth, low latency set point 800 would accommodate all types of traffic, including interactive video activity such as online gaming. A low bandwidth, low latency set point 820 is sufficient for interactive non-video activities, such as voice over IP (VOIP), but is generally not sufficient to support video streaming activities. A high bandwidth, high latency set point 810 is sufficient for video streaming, but is generally not sufficient to support interactive activities such as VOIP. Finally, a low bandwidth, high latency set point 830 is usable for basic activities such as email correspondence and simple web browsing, but is generally not sufficient to support video activities nor is it generally sufficient to support interactive activities such as VOIP. By managing a connection performance profile in the two dimensional space illustrated in FIG. 8, the selective access controller 200 can control what types of activities are permitted by individual users.

FIG. 8 illustrates an "Interactive Max" vertical line which represents an approximate maximum latency above which interactive application become unusable. While this actual number varies with the application and the tolerance of the user, the value of this number is on the order of 100 ms for most interactive applications. Thus, once packet latency exceeds about 100 ms, then participating in interactive activities, such as a two-way phone conversation, becomes difficult. In practice the interactive maximum latency could vary and might be in the range of 50 ms to 200 ms. Ideally packet latency is as low as possible for interactive applications and end to end latency of 10 ms to 20 ms is preferable. Of course, a one-way audio communication, such as online radio or an audio conference with no user participation can easily accommodate high latency.

FIG. 8 also illustrates a "Video Min" horizontal line which represents an approximate minimum bandwidth below which video based applications become unusable. The actual bandwidth consumed by video varies with the frame rate, the pixel count and the quality. A minimum requirement for low quality video is approximately 1 Mbs, although a reasonable minimum might be set to 0.5 Mbps to 2 Mbps. Higher quality video streaming requires even greater bandwidth, such as 5 Mbs to 10 Mbs. Thus, a bandwidth limit of 400 Kbps will prevent most video from being streamed, but would not be a problem for audio, which typically consumes 64 Kbps to 320 Kbps.

The vertical scale of FIGS. 3, 4, 5, 6 and 7 may be a function of both the bandwidth and the latency allocation for a user. In one embodiment the vertical axis of FIGS. 3 to 7 is represented by line 850 in FIG. 8. In this case, the maximum performance of FIG. 3 would correspond to a bandwidth/latency setting that would generally allow any activity. As performance is decreased, after crossing the vertical dotted line at point A, then interactive application are no longer possible but video streaming and web browsing can still be accomplished. As connection performance is further reduced, after crossing the horizontal dotted line at point B, then video streaming is no longer possible and only email correspondence and basic web browsing can reasonably be accommodated. Other mappings of the vertical scale in FIGS. 3 to 7 to the graph of FIG. 8 are possible using different formulae. For example, some operators may want to prevent access to all interactive applications such that the entire line representing the vertical axis of FIGS. 3 to 7 is to the right of the vertical dashed line in FIG. 8. This may be appropriate in shared public settings where phone or video calls would be disruptive.

In some embodiments, Selective Access Throttler 200 maintains profiles of users in User Data 205 that includes information regarding the characteristics of the previous user activities. Customers may be profiled based on the bandwidth and latency characteristics of the activities that they have participated in, the length of time that they utilized such applications and the frequency with which they connect to the access point. Such user-specific profiling data could be used in a number of different ways. Such data could be used to predict what connection performance policies will influence the customer behavior. The user profiling data could also be used to influence the selection of incentives to allow connection performance to be reset or adjusted. Or such data may simply be aggregated and used for research or marketing purposes.

The present invention has been described above in connection with several preferred embodiments. This has been done for purposes of illustration only, and variations of the inventions will be readily apparent to those skilled in the art and also fall within the scope of the invention.

The invention claimed is:

1. An apparatus comprising:
   a wireless router configured to allow communication with a plurality of users over a wireless network;
   a selective access controller coupled to a wired network and to the wireless router, such that the plurality of users can communicate with the wired network under the control of the selective access controller;
   a storage element coupled to the selective access controller comprising a plurality of user records, wherein each user record relates to a specific user and comprises identification information and performance allocation information, wherein the performance allocation information comprises a latency allocation;
   wherein the selective access controller utilizes the performance allocation information for each user to enforce an allocated performance setting for each user by limiting the access to the wired network of each user;
   wherein the selective access controller determines an initial allocated performance setting for a user comprising a first latency allocation when communication from the user over the wireless network is first received after a period of time of not having received communication from the user, and stores the initial performance allocation information as the performance allocation information in the record associated with the user; and
   wherein the selective access controller determines a new allocated performance setting comprising a second latency allocation different from the first latency allocation for the user after a period of time has elapsed and updates the performance allocation information in the record associated with the user, and wherein both the initial allocated performance setting and the new allocated performance setting permit communication with the wired network.

2. The apparatus of claim 1 wherein the wired network comprises at least a part of the public Internet.

3. The apparatus of claim 1 wherein the wireless network utilizes IEEE 802.11 wireless protocols.

4. The apparatus of claim 1 wherein the performance allocation information further comprises a bandwidth allocation and the selective access controller modifies the bandwidth allocation to a lower non-zero value.

5. The apparatus of claim 1 wherein the second latency allocation is a higher value than the first latency allocation.

6. The apparatus of claim 5 wherein the performance allocation information further comprises a bandwidth allocation and the selective access controller modifies the bandwidth allocation to a lower non-zero value.

7. The apparatus of claim 1 wherein the performance allocation information further comprises a bandwidth allocation and the selective access controller modifies the bandwidth allocation to a higher value.

8. The apparatus of claim 1 wherein the second latency allocation is a lower value than the first latency allocation.

9. The apparatus of claim 8 wherein the performance allocation information further comprises a bandwidth allocation and the selective access controller modifies the bandwidth allocation to a higher value.

10. The apparatus of claim 1 wherein the identification information comprises a media access control (MAC) address for a wireless adapter associated the user.

11. The apparatus of claim 1 wherein the identification information comprises device fingerprint information.

12. The apparatus of claim 1 wherein the identification information comprises browser fingerprint information.

13. A method, performed by executing instructions stored on a non-transitory computer-readable storage medium, comprising:
   receiving a connection request from a user coupled to a wireless network;

determining identification information associated with the user and storing the identification information in a record of a storage element, wherein the storage element comprises a plurality of records each relating to a specific user;

determining an initial allocated performance setting for the user when the user has not communicated over the wireless network after a period of time, and storing the initial allocated performance setting as performance allocation information in the record associated with the user, wherein the performance allocation information comprises a latency allocation and the initial allocated performance setting comprises a first latency allocation;

allowing the user to connect to a wired network while limiting the access of the user according to the allocated performance information in the record associated with the user;

determining a new allocated performance setting for the user after a period of time has elapsed, wherein the new allocated performance setting comprises a second latency allocation and wherein both the initial allocated performance setting and the new allocated performance setting permit communication with the wired network; and updating the performance allocation information in the record associated with the user using the new allocated performance setting.

14. The method of claim 13 wherein the wired network comprises at least a part of the public Internet.

15. The method of claim 13 wherein the wireless network utilizes IEEE 802.11 wireless protocols.

16. The method of claim 13 wherein the performance allocation information further comprises a bandwidth allocation and the step of determining a new allocated performance setting comprises determining a lower non-zero value for the bandwidth allocation.

17. The method of claim 13 wherein the step of determining a new allocated performance setting comprises determining a higher value for the latency allocation.

18. The method of claim 17 wherein the performance allocation information further comprises a bandwidth allocation and the step of determining a new allocated performance setting comprises determining a lower value for the bandwidth allocation.

19. The method of claim 13 wherein the performance allocation information further comprises a bandwidth allocation and the step of determining a new allocated performance setting comprises determining a higher value for the bandwidth allocation.

20. The method of claim 13 wherein the step of determining a new allocated performance setting comprises determining a lower value for the latency allocation.

21. The method of claim 20 wherein the performance allocation information further comprises a bandwidth allocation and the step of determining a new allocated performance setting comprises determining a higher value for the bandwidth allocation.

22. The method of claim 13 wherein the identification information comprises a media access control (MAC) address for a wireless adapter associated the user.

23. The method of claim 13 wherein the identification information comprises device fingerprint information.

24. The method of claim 13 wherein the identification information comprises browser fingerprint information.

* * * * *